United States Patent
Gulgunje et al.

(10) Patent No.: US 12,013,585 B2
(45) Date of Patent: Jun. 18, 2024

(54) ELECTRONIC DEVICES WITH OPTICAL FIBER RIBBONS

(71) Applicant: Apple Inc., Cupertino, CA (US)

(72) Inventors: Prabhakar Gulgunje, Cupertino, CA (US); Brian S. Medower, San Jose, CA (US); Mahmut C. Orsan, Mountain View, CA (US); Nathan K Gupta, Hillsborough, CA (US); Shifa Xu, Palo Alto, CA (US); Shubhaditya Majumdar, Santa Clara, CA (US); Wei Lin, Santa Clara, CA (US); Yazan Z Alnahhas, Stanford, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/528,023

(22) Filed: Nov. 16, 2021

(65) Prior Publication Data

US 2022/0236507 A1    Jul. 28, 2022

Related U.S. Application Data

(60) Provisional application No. 63/141,792, filed on Jan. 26, 2021.

(51) Int. Cl.
| | | |
|---|---|---|
| G02B 6/04 | (2006.01) |
| G02B 6/06 | (2006.01) |
| G02B 6/08 | (2006.01) |
| G02B 6/42 | (2006.01) |
| G02B 6/43 | (2006.01) |

(Continued)

(52) U.S. Cl.
CPC ............. *G02B 6/4403* (2013.01); *G02B 6/04* (2013.01); *G02B 6/06* (2013.01); *G02B 6/08* (2013.01); *G02B 6/4296* (2013.01); *G02B 6/4298* (2013.01); *G02B 6/43* (2013.01);
(Continued)

(58) Field of Classification Search
CPC ... G02B 6/04; G02B 6/06; G02B 6/08; G02B 6/1221; G02B 6/125; G02B 6/4249; G02B 6/4296; G02B 6/4298; G02B 6/43; G02B 6/4403
See application file for complete search history.

(56) References Cited

U.S. PATENT DOCUMENTS 4,547,040 A * 10/1985 Yamamoto ........... G02B 6/4403
385/115
4,763,975 A *  8/1988 Scifres ................. G02B 6/4249
385/115

(Continued)

*Primary Examiner* — Ryan A Lepisto
(74) *Attorney, Agent, or Firm* — Treyz Law Group, P.C.; Tianyi He

(57) ABSTRACT

A light pipe such as a fiber ribbon may be formed from fibers joined by binder such as extruded binder. The fiber ribbon or other light pipe may have bends. A light source may provide light to an input of a fiber ribbon that is guided by the fiber ribbon to a corresponding output. The output may be located in an interior portion of an electronic device or may be positioned so that light from the output exits the electronic device and illuminates external objects. The light source may have light-emitting devices on a substrate. The light-emitting devices may be vertical cavity surface-emitting laser diodes or other lasers and/or may be light-emitting diodes. Light-emitting devices may be arranged in discrete clusters corresponding to the locations of fiber cores in the fiber ribbon.

26 Claims, 9 Drawing Sheets

(51) Int. Cl.
  *G02B 6/44*   (2006.01)
  *G02B 6/122*  (2006.01)
  *G02B 6/125*  (2006.01)

(52) U.S. Cl.
  CPC ............ *G02B 6/1221* (2013.01); *G02B 6/125* (2013.01); *G02B 6/4249* (2013.01)

(56) References Cited

U.S. PATENT DOCUMENTS

| | | | |
|---|---|---|---|
| 6,379,053 B1* | 4/2002 | van Doorn | G02B 6/4292 385/59 |
| 7,077,900 B2 | 7/2006 | Park | |
| 7,189,983 B2* | 3/2007 | Aguirre | G02B 6/4249 250/365 |
| 7,197,218 B2* | 3/2007 | Cok | B29D 11/00663 362/582 |
| 7,356,231 B2* | 4/2008 | Ouderkirk | G02B 1/045 385/11 |
| 8,630,520 B2 | 1/2014 | Merbach et al. | |
| 9,025,220 B2* | 5/2015 | Nuttall | H04N 1/0083 358/497 |
| 9,435,939 B2* | 9/2016 | Yang | G02F 1/3137 |
| 10,326,528 B2* | 6/2019 | Kase | G02B 6/4214 |
| 2002/0096629 A1* | 7/2002 | Korein | H04N 1/195 250/227.11 |
| 2002/0126962 A1* | 9/2002 | Kadar-Kallen | G02B 6/4259 385/24 |
| 2004/0240806 A1 | 12/2004 | Lail et al. | |
| 2005/0056952 A1 | 3/2005 | Walker | |
| 2008/0193090 A1 | 8/2008 | Riddett et al. | |
| 2010/0029158 A1 | 2/2010 | Kamiyama et al. | |
| 2011/0277361 A1* | 11/2011 | Nichol | G02B 6/006 40/541 |
| 2014/0341519 A1 | 11/2014 | White | |
| 2019/0391326 A1 | 12/2019 | Yang et al. | |

\* cited by examiner

ELECTRONIC DEVICES WITH OPTICAL FIBER RIBBONS

This application claims the benefit of provisional patent application No. 63/141,792, filed Jan. 26, 2021, which is hereby incorporated by reference herein in its entirety.

FIELD

This relates generally to electronic devices, and, more particularly, to electronic devices with displays.

BACKGROUND

Electronic devices often have optical components. In some devices, space is at a premium, which poses challenges in conveying light for optical components between different areas in the electronic devices.

SUMMARY

An electronic device may have a light guide such as a fiber ribbon. The fiber ribbon may be formed from fibers joined by binder such as extruded binder. The fiber ribbon may have bends.

A light source may provide light to an input of the fiber ribbon. The fiber ribbon may guide the light from the light source from the input to a corresponding output. The output may be located in an interior portion of an electronic device or may be positioned within the electronic device so that light from the output exits the electronic device and illuminates external objects.

The light source may have light-emitting devices on a substrate. The light-emitting devices may be lasers such as vertical cavity surface-emitting laser diodes or other laser diodes or may be light-emitting diodes. Light-emitting devices in the light source may be arranged in clusters corresponding to the locations of fiber cores in the fiber ribbon.

DETAILED DESCRIPTION

Electronic devices may be provided with optical components. The optical components may include components that emit light and/or components that receive light. To help convey light for optical components in an electronic device, it may be desirable to provide the electronic device with light guide structures. The light guide structures may be formed from bundles of optical fibers. In some configurations, the optical fiber bundles may have elongated strip shapes such as strips with rectangular cross-sections. Such optical fiber bundles, which may sometimes be referred to as optical fiber ribbons, may be used to convey light from a light source to a desired destination and/or may be used to convey received light from a given location to a light detector (as examples).

Optical fiber bundles may be rigid, may be flexible, or may be partly rigid and partly flexible. For example, an optical fiber bundle may have rigid end segments joined by an interposed flexible middle segment. Optical fiber bundles may be formed from polymer optical fibers or other suitable fibers and/or may have straight portions and/or portions with bends. Illustrative configurations in which an electronic device is provided with polymer optical fiber ribbons having bends may sometimes be described herein as an example.

Figure 1:
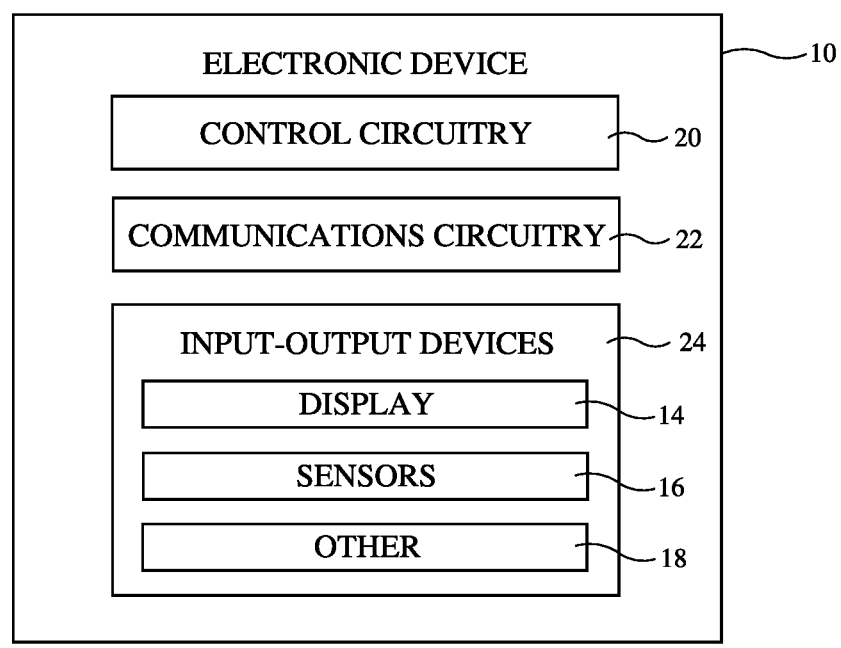
FIG. 1 is a schematic diagram of an illustrative electronic device in accordance with an embodiment.

A schematic diagram of an illustrative electronic device having an optical fiber ribbon is shown in FIG. 1. Device 10 may be a cellular telephone, a tablet computer, a laptop computer, a wristwatch device, head-mounted device, or other wearable device, a television, a stand-alone computer display or other monitor, a computer display with an embedded computer (e.g., a desktop computer), a system embedded in a vehicle, kiosk, or other embedded electronic device, a media player, or other electronic equipment. Configurations in which device 10 is a cellular telephone, tablet computer, or other portable electronic device may sometimes be described herein as an example. This is illustrative. Device 10 may, in general, be any suitable electronic device with a display.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use a display and other output devices in providing a user with visual output and other output.

To support communications between device 10 and external equipment, control circuitry 20 may communicate using communications circuitry 22. Circuitry 22 may include antennas, radio-frequency transceiver circuitry (wireless transceiver circuitry), and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a wireless link operating at a frequency between 6 GHz and 300 GHz, a 60 GHz link, or other millimeter wave link, cellular telephone link, wireless local area network link, personal area network communications link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display or microLED display are sometimes described herein as an example.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, laser diodes and/or light-emitting diodes for status indicators, light sources such as laser diodes and/or light-emitting diodes configured to provide light that is used to illuminate portions of device 10 and/or external objects, light sources associated with other optical output devices, and/or other circuitry for gathering input and/or providing output. Device 10 may also include a battery or other energy storage device, connector ports for supporting wired communication with ancillary equipment and for receiving wired power, and other circuitry.

The components of device 10 may be mounted in a housing. The housing may have any suitable shape (e.g., a shape configured to be worn on a user's body, a shape configured to be held in a user's hand, a shape configured to rest on a table top or other surface, etc.). As an example, the housing of device 10 may form front and rear housing walls, sidewall structures, and/or internal supporting structures (e.g., a frame, an optional midplate member, etc.). Housing structures may be formed from glass, polymer, metal, ceramic, and/or other materials.

During operation of device 10, it may be desirable to convey light between a first location and a second location. The first location and/or the second location may be an interior location within the housing walls that form device 10 and/or may be a location on the surface of device 10 and/or an exterior location surrounding device 10. An optical fiber ribbon may be used to form a light guiding path that conveys light along at least part of the distance between the first and second locations. As an example, an optical fiber ribbon may convey light from a light source to a location where light is emitted outwardly from device 10. As another example, an optical fiber ribbon may convey light to a light detecting component.

Figure 2:
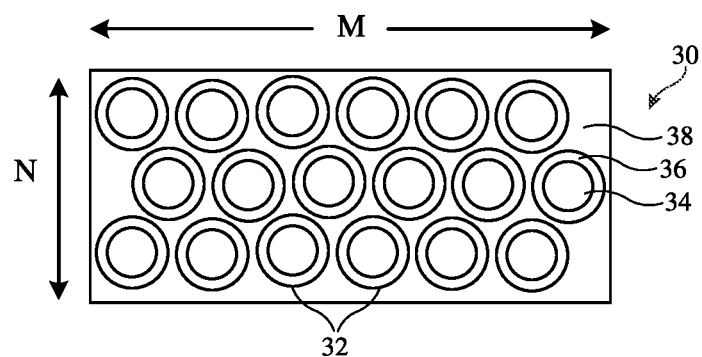
FIG. 2 is a cross-sectional view of an illustrative fiber ribbon in accordance with an embodiment.

FIG. 2 is a cross-sectional side view of an illustrative optical fiber ribbon. As shown in FIG. 2, optical fiber ribbon 30 may contain multiple optical fibers 32. Fibers 32 may be packed into ribbon 30 using a hexagonal packing scheme as shown in FIG. 2 or using other packing arrangements. Fibers 32 may have cores 34 surrounded by claddings 36. In an illustrative configuration, the refractive index of claddings 36 is lower than the refractive index of cores 34 to promote light guiding within cores 34 in accordance with the principal of total internal reflection. Optional binder 38 may surround and bind together fibers 32 to form ribbon 30.

Binder 38, cladding 36, and cores 34 may be formed from glass, polymer, and/or other materials. Illustrative configurations in which the structures of ribbon 30 are formed from polymer may sometimes be described herein as an example. Illustrative polymers for forming cores 34 include polymethyl methacrylate (PMMA), polycarbonate (PC), and cyclic olefin polymer (COP). Examples of polymer cladding materials for fibers 32 include polyvinylidene fluoride, polyvinylidene difluoride, terpolymers of ethylene, tetrafluoroethylene, and hexafluoropropylene, and terpolymers of tetrafluoroethylene, hexafluoropropylene and vinylidene fluoride. These materials and/or other polymers (e.g., amorphous polymers and/or other polymers) may be used for core material, cladding, binder, other coating layers, and/or other polymers involved in the fabrication of ribbon 30. In some configurations, it may be desirable for binder 38 to soften and/or flow at a temperature at below the temperatures at which cores 34 and claddings 36 soften and/or flow, so that the binder can be molded around the cores and claddings without distorting the cores and claddings.

The diameters of fibers 32 may be 60-100 microns, at least 20 microns, at least 40 microns, at least 50 microns, less than 300 microns, less than 200 microns, less than 120 microns, and/or other suitable diameter. The thickness of cladding 36 may be 1-3 microns, at least 0.3 microns, at least 0.9 microns, less than 9 microns, less than 6 microns, less than 4 microns, or other suitable thickness.

Ribbon 30 may have a rectangular cross-sectional shape or other suitable shape. In the example of FIG. 2, ribbon 30 contains multiple layers (sometimes referred to as sheets) of fibers 32 each of which contains multiple fibers, so that ribbon 30 has an N×M array of fibers 32. There may be any suitable number of fibers in ribbon 30 (e.g., 50-100, 84, 30-150, at least 10, at least 20, at least 35, at least 45, fewer than 400, fewer than 300, fewer than 150, fewer than 110, etc.). The value of N and the value of M may be at least 1, at least 2, at least 3, at least 4, at least 5, at least 10, less than 50, less than 30, less than 20, less than 10, less than 5, etc. As an example, N may be 2-10, 3-8, or other suitable number and M may be 5-20, 8-18, 9-16, or other suitable number. In arrangements in which M is less than N, ribbon 30 may have a rectangular cross-sectional shape.

Figure 3:
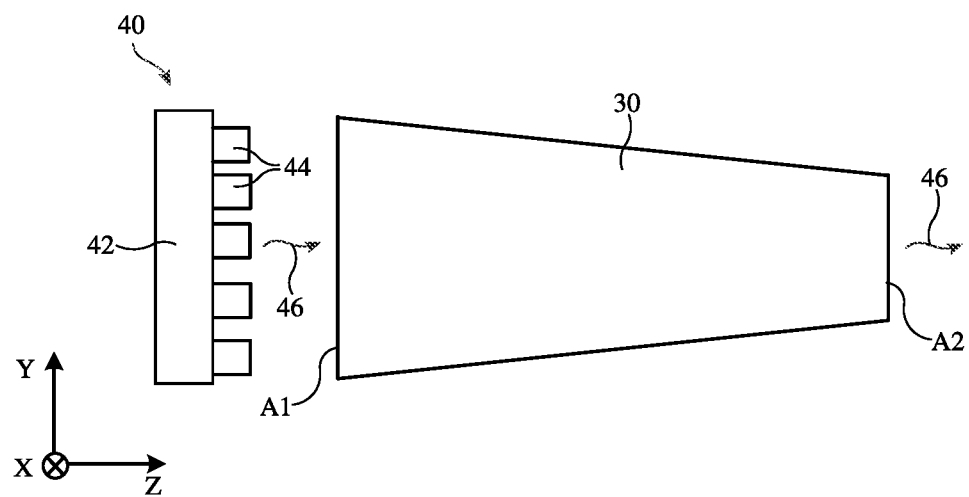
FIG. 3 is a side view of an illustrative light source and associated fiber ribbon in accordance with an embodiment.

As shown in the side view of FIG. 3, light source 40 may emit light 46. Ribbon 30 may be used in device 10 to convey light 46 between a first location (an input of ribbon 30) to a second location (an output of ribbon 30). In the example of FIG. 3, light source 40 includes a printed circuit substrate or other substrate (substrate 42) with light-emitting devices 44. Devices 44 may be light-emitting diodes (e.g., organic light-emitting diodes, light-emitting diodes formed from crystalline semiconductor die, resonant cavity diodes, etc.), may be lasers (e.g., vertical cavity surface emitting lasers or other laser diodes), and/or other light-emitting components. There may be any suitable number of light-emitting devices 44 in light source 40 (e.g., at least 1, at least 2, at least 4, at least 8, at least 12, at least 25, at least 100, fewer than 1000, fewer than 300, fewer than 100, fewer than 50, fewer than 25, fewer than 10, 10-100, 20-300, 2-25, etc.).

Devices 44 may be arranged in a uniform array on substrate 42 or may be arranged in a non-uniform pattern (e.g., there may be a separate cluster of devices 44 associated with each fiber input, and these clusters may be separated from each other by gaps that are larger than the fiber-center-to-fiber-center spacing within each cluster). When clustered, the cluster adjacent to each fiber entrance may have any suitable number of devices 44, which are used to provide light to the entrance of that fiber 32 (e.g., at least 1, at least 3, at least 5, 5-10, fewer than 20, fewer than 10, fewer than 8, etc.). Fibers 32 and ribbon 30 may be transparent to any suitable wavelengths of light 46 (e.g., infrared light, ultraviolet light, and/or visible light). As an example, light source 40 may emit visible and/or infrared light and this visible and/or infrared light may by conveyed though the optical fibers in ribbon 30 in accordance with the principal of total internal reflection.

Figure 4:
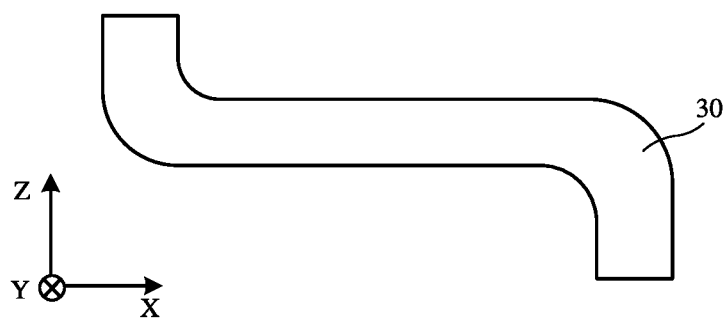
FIG. 4 is a side view of an illustrative fiber ribbon with bends in accordance with an embodiment.

In the example of FIG. 3, optical fiber ribbon 30 is characterized by an input of area A1 and an output of area A2. The values of A1 and A2 may be the same, A1 may be larger than A2 (as shown in FIG. 4), or A2 may be larger than A1. The cross-sectional shapes of ribbon 30 at the input and output of ribbon 30 may be rectangular, oval, circular, and/or other suitable shapes. The input and output shapes of ribbon 30 may be the same or may be different. The value of A1 and A2 may be at least 0.01 mm$^2$, at least 0.1 mm$^2$, at least 1 mm$^2$, less than 5 mm$^2$, less than 0.5 mm$^2$, or less than 0.05 mm$^2$ (as examples). The length of ribbon 30 may be 9-19 mm, 5-30 mm, at least 1 mm, at least 3 mm, at least 5 mm, at least 8 m, less than 100 mm, less than 40 mm, less than 20 mm, and/or other suitable length. The aspect ratio of the side profile of ribbon 30 (length divided by minimum lateral dimension across the ribbon 30) may be at least 10, at least 100, at least 1000, less than 2000, less than 200, or less than 20 (as examples). The aspect ratio of the end view of ribbon 30 (M divided by N) may be at least 2, at least 4, at least 8, at least 20, less than 50, less than 25, less than 12, less than 6, less than 3, or other suitable value.

As shown in FIG. 4, there may be one or more bends along the length of ribbon 30. Ribbon 30 may have any suitable number of bends (e.g., no bends, at least 1 bend, at least 2 bends, at least 3 bends, 3-10 bends, fewer than 10 bends, fewer than 5 bends, fewer than 4 bends, fewer than 3 bends, etc.). Ribbon 30 may lie exclusively within one plane (e.g., a bent ribbon may lie in the X-Z pane of FIG. 4) or may bend in multiple directions to form a desired three-dimensional (non-planar) light pipe. For example, ribbon 30 may have a first bend about the Y axis, a second bend about the X axis, and a third bend about the Z axis (as an example).

Figure 5:
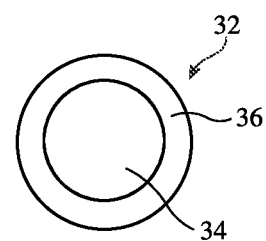
FIG. 5 is a cross-sectional end view of an illustrative fiber with a core and cladding in accordance with an embodiment.
Figure 6:
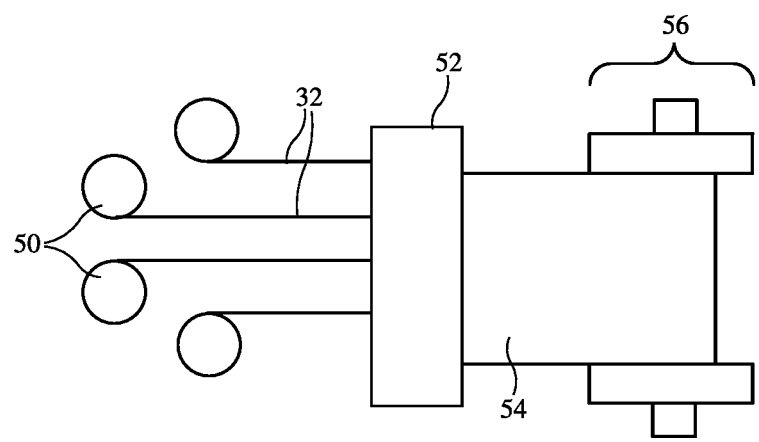
FIG. 6 is a diagram of an illustrative tool for forming fiber ribbons using optical fibers such as the optical fiber of FIG. 5 in accordance with an embodiment.

In an illustrative configuration, optical fibers 32 are extruded fibers having cores 34 surrounded by claddings 36 as shown in FIG. 5. Following extrusion from a fiber extrusion tool to form fibers such as fiber 32 of FIG. 2, multiple fibers 32 of the type shown in FIG. 5 may be provided from fiber spools 50 to a liquid binder dispenser such as dispenser 52 of FIG. 6. Dispenser 52 may dispense liquid polymer such as light-curable polymer (e.g., ultraviolet-light-curable polymer serving as binder 38) onto the set of fibers 32 from spools 50 to form a sheet of fibers such as fiber sheet 54. Sheet 54 may be wound in one or more layers onto sheet take-up spool 56 until a desired thickness of optical fibers 32 has been formed (e.g., a thickness of N sheets of fibers 32). The same quantity and/or type of polymer binder may be dispensed along the entire length of fibers 32 by dispenser 52 or the quantity and/or type of binder that is dispensed may be varied along the length of fibers 32 (e.g., to vary the rigidity and/or other properties of the fiber ribbon being formed along the length of the ribbon). Following application of ultraviolet light to cure the binder, ribbons 30 may be formed by cutting out desired lengths of ribbon from the sheets of fibers wound onto spool 56.

Figure 7:
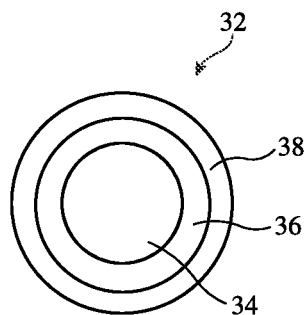
FIG. 7 is a cross-sectional end view of an illustrative fiber with a core, cladding, and binder layer in accordance with an embodiment.
Figure 8:
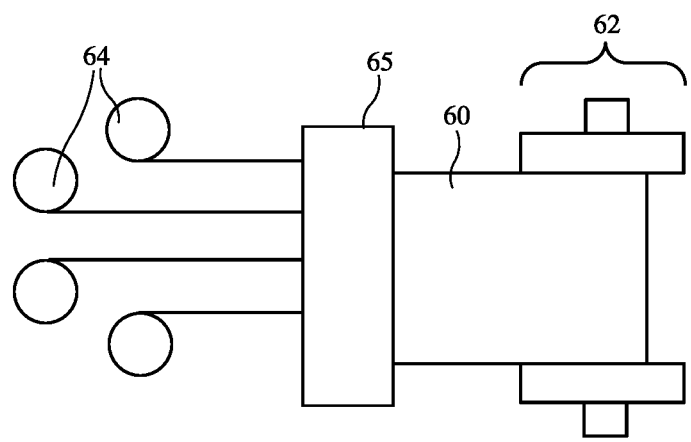
FIGS. 8 and 9 are diagrams of illustrative equipment for forming fiber ribbons using optical fibers such as the optical fiber of FIG. 7 in accordance with an embodiment.
Figure 9:
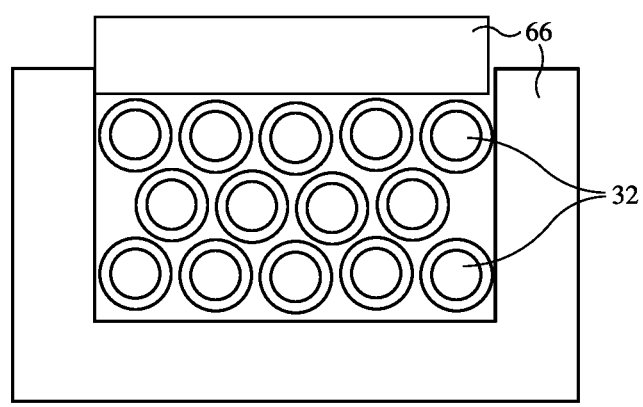

Another illustrative technique for forming ribbon 30 is shown in FIGS. 7, 8, and 9. As shown in FIG. 7, a fiber extrusion tool may be used to extrude fibers 32 that each have a core (core 32), cladding 36, and binder 38. These binder-coated fibers 32 can then be wound as a sheet (sheet 60) from spools 64 onto fiber sheet take-up spool 62, as shown in FIG. 8. Guide 65 of FIG. 8 may help combine fibers 32 into sheet 60 and may, if desired, apply heat to help soften binder 38. Binder 38 can also be softened during fiber fusion operations in which sheets of fibers are pressed together to form ribbon 30. As shown in FIG. 9, for example, after a desired number of sheets have been wound on top of each other in spool 62, heat and/or pressure may be applied by mold members 66 (e.g., a mold formed by the sides of spool 62 and an external member and/or other mold structures). The heat and/or pressure causes binder 38 to soften and flow and thereby bind together fibers 32 to form ribbon 30.

Figure 10:
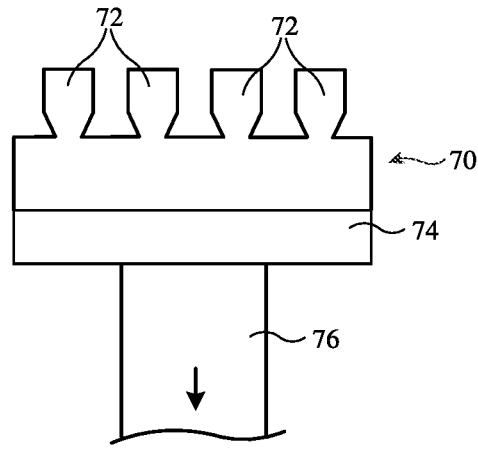
FIG. 10 is a side view of an illustrative fiber extrusion tool for forming an optical fiber ribbon embedded in a fiber having a removable polymer coating in accordance with an embodiment.
Figure 11:
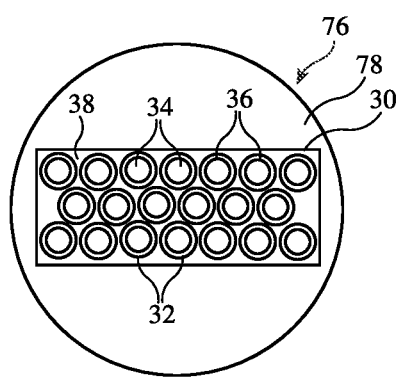
FIG. 11 is a cross-sectional end view of an illustrative extruded optical fiber ribbon embedded in a removable polymer coating in accordance with an embodiment.
Figure 12:
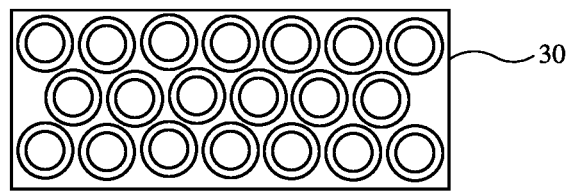
FIG. 12 is a cross-sectional end view of the extruded optical fiber ribbon of FIG. 11 following removal of the removable polymer coating in accordance with an embodiment.

If desired, ribbon 30 may be extruded within a removable polymer coating. This type of arrangement is shown in FIGS. 10, 11, and 12. As shown in FIG. 10, extrusion tool 70 may have sources 72. Sources 72 may, respectively, contain polymer material for cores 34, cladding 36, binder 38, and a removable polymer coating layer. During extrusion, fiber ribbon 30 (e.g., multiple fibers 32 joined by binder 38) may be extruded within a removable polymer coating. As shown in FIG. 10, for example, extrusion die 74 may receive each of the polymers from sources 72 and may extrude these polymers into extruded fiber 76. As shown in the cross-sectional side view of extruded fiber 76 of FIG. 11, fiber 76 may have a circular cross-sectional shape formed from removable polymer 78. Fiber ribbon 30 may be formed from a set of fibers 32 embedded in the center of removable polymer 78. Fibers 32 may include extruded cores 34 coated with extruded cladding 36 and bound together using extruded binder 38. During extrusion, surface tension causes fiber 76 to assume its circular cross-sectional shape. Removable polymer coating 76 may be sufficiently thick to help preserve an extruded rectangular shape (or other desired cross-sectional shape) for ribbon 30 (e.g., by preventing the surface tension of fiber 76 from distorting the rectangular shape of ribbon 30). The diameter of fiber 76 divided by the minimum lateral dimension of ribbon 30 may be, as an example, at least 1, at least 2, at least 4, at least 8, less than 30, less than 10, less than 3, or other suitable value.

Figure 13:
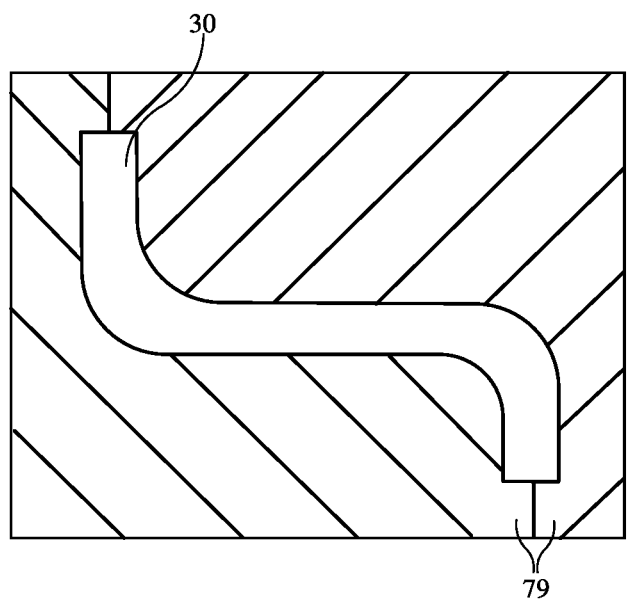
FIG. 13 is a cross-sectional side view of an illustrative fiber ribbon being molded into a desired shape within a mold in accordance with an embodiment.

After the soft extruded materials of fiber 76 have solidified, removable polymer 78 (e.g., a water soluble polymer) can be dissolved and thereby removed from the exterior of ribbon 30 (formed, e.g., from polymers that are not water soluble), leaving a length of ribbon material of the type shown by ribbon 30 of FIG. 12. Ribbon 30 may then be molded under heat (e.g., a temperature of 80-120° C. or other suitable elevated temperature) and/or pressure in a mold such as mold 79 of FIG. 13 to form a desired final shape for ribbon 30 (e.g., a shape with one or more optional bends, a three-dimensional shape, an S-shape, and/or other suitable shape). Ribbon 30 may then be assembled with optical component(s) and/or other structures (see, e.g., input-output devices 24 of FIG. 1) into device 10.

Figure 14:
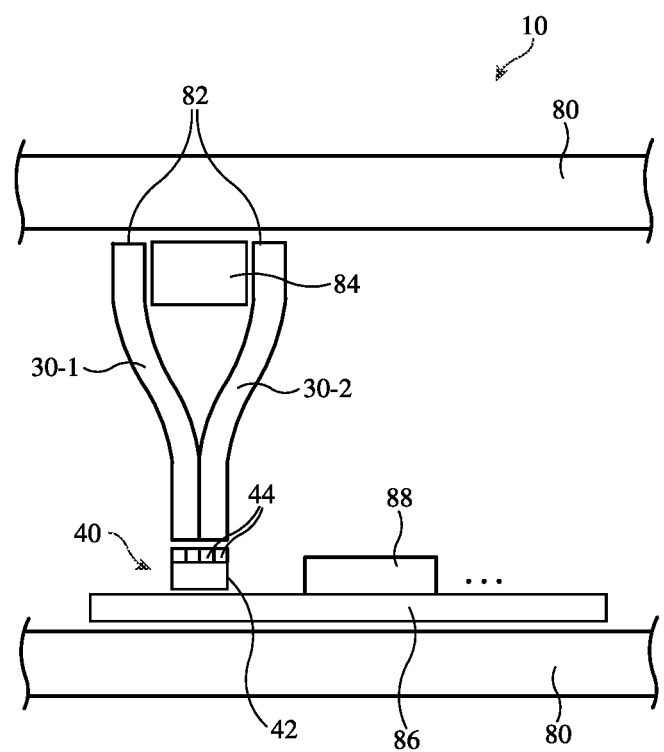
FIG. 14 is a side view of a portion of an illustrative electronic device with a fiber ribbon structure in accordance with an embodiment.

One or more fiber bundles such as ribbon 30 may be used to convey light between any suitable locations in device 10. In the example of FIG. 14, device 10 has structures 80 such as housing structures. Light is provided to one or more optical fiber ribbons from light source 40 (e.g., a light source in the interior of device 10). In the illustrative arrangement of FIG. 14, a first ribbon (ribbon 30-1) and a second ribbon (ribbon 30-2) receive light from light source 40 and emit this light at ribbon exits (outputs) 82. This emitted light may optionally pass through a transparent housing wall or other structure 80 to the exterior of device 10. The ribbon(s) of device 10 may be configured to route light past internal components and/or other structures (see, e.g., structure 84, which may be a bracket or other support structure, an electrical component such as one of sensors 16, one of components 18, and/or any other input-output device 24 or component in device 10). Light source 40 may be formed from light-emitting devices 44. Devices 44 may be mounted on substrate 42 and/or a larger substate such as printed circuit 80 that also receives additional components 88 (e.g., integrated circuits, control circuitry 20 and/or communications circuitry 22, sensors 16, and/or other input-output devices 24, etc.).

Figure 15:
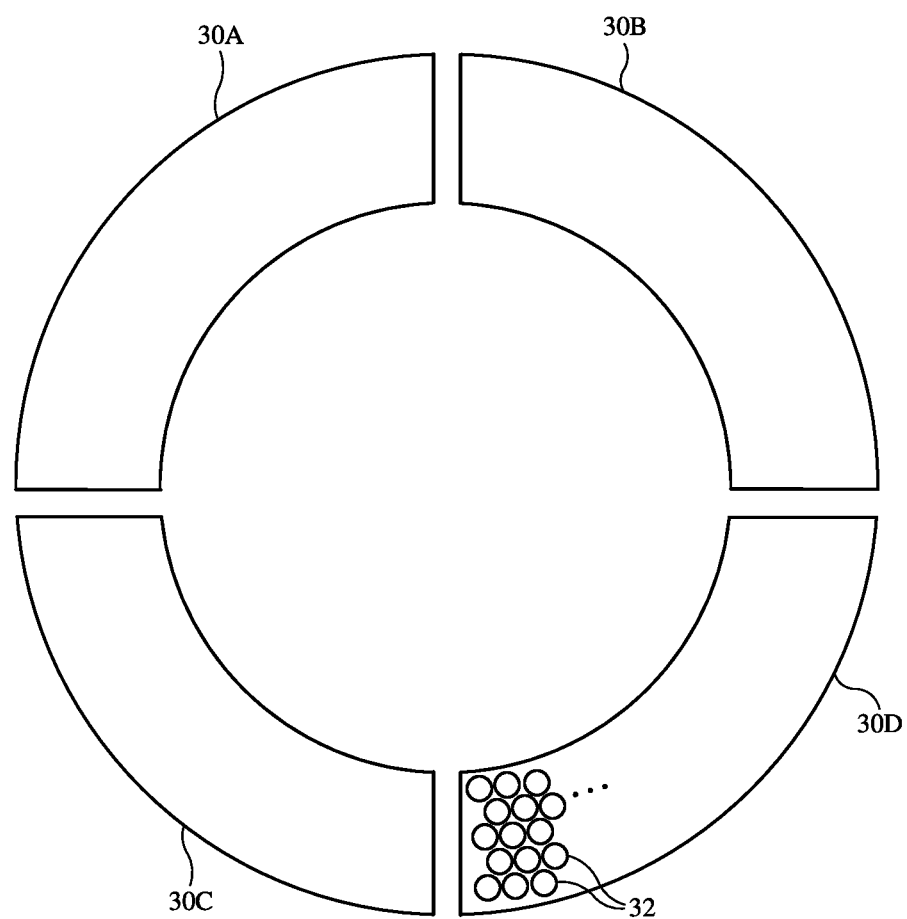
FIGS. 15 and 16 are top views of illustrative sets of fiber ribbons arranged to surround a central area in accordance with an embodiment.
Figure 16:
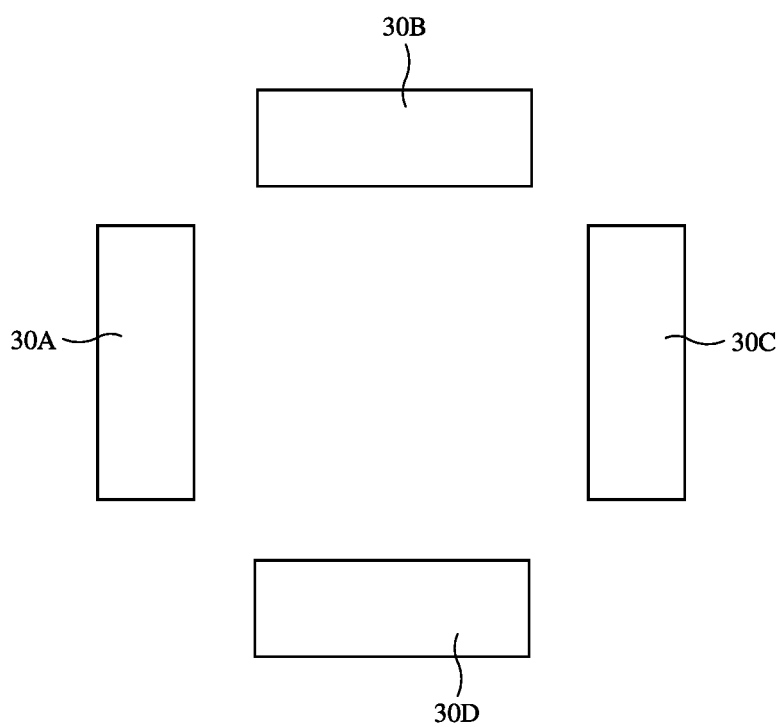

As this example demonstrates, light from light source 40 may be emitted from the output(s) of ribbon(s) in various different shapes. In the example of FIG. 15, four ribbons 30A, 30B, 30C, and 30D have inputs that receive light from light source 40 and four corresponding outputs (shown in FIG. 15) that emit this light after the light has traveled through the four ribbons. As shown in FIG. 15, ribbons 30A, 30B, 30C, and 30D may have curved output shapes that form, for example, four respective curved segments of a ring (e.g., a ring that surrounds a circular area that can optionally receive structure 84 of FIG. 14). The ring of FIG. 15 is circular, but other light output shapes may be formed from one or more ribbons (see, e.g., the rectangular ring in the example of FIG. 16, which surrounds a rectangular area).

Using ribbon fabrication techniques of the type shown in FIGS. 10, 11, and 12 and/or the other ribbon fabrication techniques described herein, a desired fiber placement accuracy within ribbon 30 may be achieved, thereby helping to enhance the ability for the ribbon to receive light from light source 40 and guide this light to the ribbon output. For example, fiber centers may be placed close to their desired locations so that the amount of fiber-center-to-fiber-center spacing (pitch) variation within ribbon 30 is small. As an example, within one standard deviation in pitch value from the mean pitch value of fibers 32 in ribbon 30, the pitch value of fibers 32 may vary from the mean pitch value by less than 5%, less than 3%, less than 1.5%, or less than 1% (as examples).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
    a housing that comprises a housing wall;
    an internal structure adjacent to the housing wall;
    a printed circuit substrate on which an integrated circuit is mounted;
    a light source mounted on the printed circuit substrate and configured to emit light;
    a fiber ribbon that is configured to receive the emitted light at a fiber ribbon input and guide the light from the fiber ribbon input to a corresponding fiber ribbon output, wherein the fiber ribbon comprises optical fibers in binder, wherein the fiber ribbon has a first end at the light source mounted on the printed circuit substrate and a second end at the housing wall, and wherein the fiber ribbon bends around the internal structure and is configured to route the emitted light around the internal structure; and
    an additional fiber ribbon that is configured to receive additional light emitted by the light source at an additional fiber ribbon input and guide the additional light from the additional fiber ribbon input to a corresponding additional fiber ribbon output, wherein the fiber ribbon and the additional fiber ribbon surround the internal structure on opposing sides of the internal structure.

2. The electronic device defined in claim 1 wherein the fiber ribbon input has a rectangular cross-sectional shape.

3. The electronic device defined in claim 2 wherein the light source comprises a plurality of light-emitting devices.

4. The electronic device defined in claim 3 wherein the emitted light comprises visible light and wherein the plurality of light-emitting devices comprise lasers arranged in clusters.

5. The electronic device defined in claim 1 wherein the optical fibers are characterized by a pitch and wherein pitch values within one standard deviation of a mean pitch value for the optical fibers vary by less than 1.5%.

6. The electronic device defined in claim 1 wherein the optical fibers each comprise a polymer core covered with a polymer cladding and wherein the fiber ribbon has rigid end segments joined by a flexible center segment.

7. The electronic device defined in claim 1 wherein the fiber ribbon has at least two bends.

8. The electronic device defined in claim 1 wherein the internal structure comprises an electrical component adjacent to the fiber ribbon output.

9. The electronic device defined in claim 8 wherein the electrical component comprises a sensor.

10. The electronic device defined in claim 9 wherein the sensor comprises a light-sensing component.

11. The electronic device defined in claim 1 wherein the optical fibers each have a core covered with a cladding and wherein the binder surrounds the optical fibers.

12. The electronic device defined in claim 11 wherein the cores comprise polymer.

13. The electronic device defined in claim 12 wherein the cladding on each of the optical fibers comprises polymer.

14. The electronic device defined in claim 13 wherein the cores have a first refractive index and wherein the cladding has a second refractive index that is less than the first refractive index.

15. The electronic device defined in claim 14 wherein the binder comprises polymer.

16. The electronic device defined in claim 15 wherein the polymer of the cores comprises amorphous polymer.

17. The electronic device defined in claim 1 wherein the light source comprises a plurality of light-emitting devices on the printed circuit substrate.

18. The electronic device defined in claim 17 wherein the plurality of light-emitting devices comprise visible-light vertical cavity surface emitting lasers.

19. The electronic device defined in claim 1 wherein the fiber ribbon is configured to route the emitted light around the internal structure for output through the housing wall to an exterior of the electronic device.

20. The electronic device defined in claim 1, wherein the housing wall separates an interior of the electronic device from an exterior of the electronic device.

21. The electronic device defined in claim 20, wherein the housing wall is transparent and the emitted light is conveyed through the housing wall.

22. The electronic device defined in claim 1 further comprising:
a display mounted within the housing; and
wireless communication circuitry mounted within the housing.

23. An electronic device, comprising:
a housing that comprises a housing wall;
an internal structure adjacent to the housing wall;
a printed circuit substrate on which an integrated circuit is mounted;
a light source mounted on the printed circuit substrate and configured to emit light; and
a fiber ribbon that is configured to receive the emitted light at a fiber ribbon input and guide the light from the fiber ribbon input to a corresponding fiber ribbon output, wherein the fiber ribbon comprises optical fibers in binder, wherein the fiber ribbon has a first end at the light source mounted on the printed circuit substrate and a second end at the housing wall, wherein the fiber ribbon bends around the internal structure and is configured to route the emitted light around the internal structure, wherein the internal structure comprises an electrical component adjacent to the fiber ribbon output, and wherein the electrical component comprises an image sensor.

24. An electronic device, comprising:
a housing that comprises a housing wall;
an internal structure adjacent to the housing wall;
a printed circuit substrate on which an integrated circuit is mounted;
a light source mounted on the printed circuit substrate; and
first and second fiber ribbons each configured to receive light from the light source at a fiber ribbon input and guide the light from the fiber ribbon input to a corresponding fiber ribbon output, wherein the first and second fiber ribbons each comprise optical fibers in binder, wherein the first and second fiber ribbons each have a first end at the light source mounted on the printed circuit substrate and a second end at the housing wall, and wherein the internal structure is between the first and second fiber ribbons.

25. The electronic device defined in claim 24, wherein the first and second fiber ribbons are configured to output light for first and second corresponding segments of a shape.

26. The electronic device defined in claim 24, wherein the first and second fiber ribbons each bend around the internal structure to route the light along a different side of the internal structure.

* * * * *